Patented May 5, 1953

2,637,694

UNITED STATES PATENT OFFICE 2,637,694

GREASE COMPOSITIONS

Walter H. Peterson, Point Richmond, and Thurston Skei, Lafayette, Calif., assignors to Shell Development Company, Emeryville, Calif., a corporation of Delaware No Drawing. Application April 13, 1951,
Serial No. 220,986

8 Claims. (Cl. 252—18)

This invention relates to improved grease compositions. More particularly, it is directed to greases possessing improved corrosion characteristics.

Greases employed for their normal lubricating purposes exhibit three principal types of corrosion phenomena. These are generally termed dynamic corrosion, static corrosion and fretting corrosion. Dynamic corrosion is regarded as the type of deterioration which occurs when a metal surface, such as a wheel bearing, is coated with grease and is used in its normal manner for lubricated operation. Dependent upon the severity of the conditions, which include speed, pressure, temperature and the amount of water present, various greases will exhibit more or less evidences of attack upon the bearing surfaces. This may range all the way from mere discoloration of the surface to a complete breakdown of the bearing assembly. Greases which are ordinarily regarded as water sensitive, such as those gelled with sodium soaps of fatty acids, do not usually exhibit dynamic corrosion characteristics. The more water resistant greases including lithium 12-hydroxy stearate greases also had acceptable dynamic corrosion properties.

Under normal operating conditions a vehicle having wheel bearings may be subjected to operation during wet weather without immediately exhibiting any adverse effect upon the grease or the bearings. However, upon standing after such a wet operating period, the grease covered bearings may become corroded and eventually cause failure in later operation. This type of corrosion occurring during a static period but following dynamic operation is usually termed "static corrosion." Machinery which is lubricated with greases and subjected to intermittent influence of hydrous atmosphere and standing periods are particularly subject to the detrimental influence of static corrosion.

Fretting corrosion is a special type of attack which occurs, for example, during freight car shipment of new vehicles wherein the bearings are subjected for an extended period to vibration or oscillating motion causing a special type of erosive attack.

Numerous attempts have been made to overcome the various kinds of corrosion phenomena. Many additives which have been found to be effective in ordinary lubricating oil compositions are of little use when incorporated in greases. This may be for one or two main reasons. First, the additive may prove to be substantially ineffective when employed in the presence of the gelling agent. Secondly, when utilized in an amount sufficient to overcome the evidences of corrosion the agent may impart an undesirable water sensitivity to the grease, thus permitting it to emulsify badly with water and to be washed freely from the bearing surfaces.

It is an object of the present invention to improve the corrosion characteristics of certain greases. More especially this invention provides improved static corrosion characteristics in greases which are gelled with soaps predominating in higher hydroxy fatty acids. Other objects will become apparent during the following discussion.

Now in accordance with the present invention, it has been found that the static corrosion properties of greases gelled with soaps predominating in higher hydroxy fatty acid soaps are substantially improved by the addition thereto of magnesium hydroxide. More particularly, the invention is concerned with greases comprising oils gelled with about 5 to about 25% of soaps predominating in higher hydroxy fatty acid soaps and containing about 1–20% (based on weight of the soaps) of magnesium hydroxide.

This invention is particularly unexpected in view of the fact that other alkaline earth metal hydroxides, such as lime, have been found to impart no beneficial effects to the same type of greases and, in fact, degrade the grease with respect to other properties, such as dynamic corrosion.

The amount of magnesum hydroxide to be used in the greases of this invention has been found to be relatively critical in that amounts less than about 1% of magnesium hydroxide (based on the weight of the soap) are ineffective for preventing static corrosion, while amounts above about 20%, based on the weight of the soap, unduly soften the grease and cause increased water sensitivity thereof. The reason for the softening of the grease is obscure at the present time and no explanation is now available. However, it has been ascertained that magnesium hydroxide, when dispersed in the proper form, imparts a gelling action to grease but only when a minor amount of soap relative thereto is present. As the proportion of soap is progressively increased beyond that point, the gelling action of magnesium hydroxide becomes increasingly less and eventually reverts to a softening rather than a gelling action. Hence, for the purpose of the present invention the proportion of magnesium hydroxide should be less than about 20% as defined above. The proportion may be expressed in somewhat different terms by relating the amount with respect to the total grease constituents. In these terms, optimum results are obtained by the use of from about 0.05% and about 1% of magnesium hydroxide based on the total weight of the grease. Preferably, in the latter respect, the amount of magnesium hydroxide is between about 0.25 and about 0.75% based on the total grease composition or is between about 2.5 and about 15% based on the weight of soap.

The magnesium hydroxide may be incorporated in the grease by numerous methods, among which the following are the most important: A finished grease gelled principally with a soap of higher hydroxy fatty acids can be milled with an oleogel of magnesium hydroxide. Alternatively, a slurry of oil and hydroxy fatty acid soap is mixed with a hydrosol or hydrogel of magnesium hydroxide and subsequently the mixture is subjected to dehydration. The grease, during homogenization, is improved by the uniform dispersal of the dehydrated magnesium hydroxide. A third process comprises adding a previously prepared soap of a higher hydroxy fatty acid to a magnesium hydroxide hydrogel and subsequently incorporating the mixture in oil preferably by milling the constituents and then dehydrating by means of heat, reduced pressure or both. Finally, the dehydrated constituents are milled to obtain a uniform grease structure.

The process of this invention is applicable to greases wherein the thickening agent is one or more soaps of hydroxy fatty acids having grease forming properties. While unsaturated hydroxy fatty acids may be employed as the sole, principal or minor acid used in forming the soap, saturated higher hydroxy fatty acids are preferred since they appear to have better gelling values than their unsaturated homologs. By the expression "higher hydroxy fatty acid," as used in this specification and in the claims appearing hereinafter, is meant an acid wherein the hydroxy alkyl radical contains more than 10 carbon atoms, and preferably more than 12 carbon atoms in the chain. The invention is thus particularly applicable to greases based on the soaps of saturated hydroxy fatty acids, such as hydroxy stearic acid, e. g., 9-, 10-, 11-, 12- and 13-hydroxy stearic acids or their homologs and analogs, such as hydroxy palmitic acids, including 10- and 15-hydroxy palmitic acid. Other suitable acids for use in the formation of grease-forming soaps include the following:

Hydroxy myristic acids, e. g., 1-hydroxy myristic acid
Hydroxy behenic acid
5,6-dihydroxy stearic acid
2,11-dihydroxy palmitic acid Other di- or polyhydroxy fatty acids may be employed such as 6,7-, 7,8-, 8,11-, 9,10-, and 10,11-dihydroxy stearic acids. The most common variety (due to its natural source) is 12-hydroxy stearic acid, which is derived by the saponification of hydrogenated castor oil or hydrogenated castor oil fatty acids.

It has been determined that the present invention is applicable to soap mixtures containing a minimum of 35% lithium hydroxy fatty acid soaps. Preferably, however, the amount of soaps other than the lithium hydroxy fatty acid soaps is less than about 50% of the total soap content.

Other soaps which may be mixed with the hydroxy fatty acid soaps include lithium soaps of stearic, myristic, palmitic, oleic, and behenic acids; aluminum naphthenate; and sodium, aluminum or calcium stearate or palmitate may be present. Some sodium soaps of hydroxy fatty acids are normally present in the commercial mixtures of soaps formed from commercial lithium hydroxide and hydrogenated castor oil acids. Saponification of the natural glycerides (such as hydrogenated castor oil) increases the gelling properties of the soaps. The grease should usually contain between about 5% and about 25% by weight of soap, and preferably between 6.5% and 15% soap.

The preferred type of soap made from the above grease of hydroxy fatty acids is lithium 12-hydroxy stearate. However, other alkali metal soaps may be used such as the sodium and potassium soaps. Alkaline earth metal soaps of the hydroxy fatty acids may be used and include magnesium, calcium, barium, beryllium and strontium soaps. Amphoteric metal soaps such as those of aluminum and lead are also suitable as well as the analogous soaps of tin, zinc and antimony.

The present invention is particularly applicable to water resistant greases such as those capable of passing the water resistance test described in the Army-Navy Aeronautical Grease Specification An-G-3a. In this test 20 g. of the grease are mixed with 1 cc. additions of water until the final increment of water cannot be worked into the grease within five minutes. The An-G-3a specification permits a maximum of 100% water absorption.

Typical greases may be prepared from the following soaps which are understood to represent the class but not to constitute any restriction therein:

Lithium 12-hydroxy stearate
Lithium 12-hydroxy palmitate
Lithium 9,10-dihydroxy stearate
Lead 5,6-dihydroxy stearate
Lead 12-hydroxy stearate
Barium 8,11-dihydroxy stearate
Barium 10-hydroxy palmitate The base lubricant for forming the greases of this invention may be selected from a wide variety of natural and synthetic oils. Mineral oils of wide viscosity range varying from about 50 to 2,000 SUS at 100° F. and having a viscosity index of from below zero to about 80 can be used as well as their mixtures. A preferred mineral oil base may be prepared by redistilling a gas oil over caustic soda, extracting the distillate with sulfur dioxide and refining the raffinate with a suitable adsorbent material to give an oil having the following properties:

Specific gravity at 60° F. _____ 0.861
Flash point, °F. _____ 275
Pour point, °F. _____ −70
Final B. P., °C. (ASTM) _____ 370

| S. G. Oil (60° F.) | Flash Point Closed (° F.) | Viscosity Red. I (secs.) | | K. V. I. | Pour Point (° F.) | Leendertse Type Analysis | | |
|---|---|---|---|---|---|---|---|---|
| | | 140° F. | 70° F. | | | Aromatics | Paraffins | Naphthenes |
| A—0.861 | 275 | ---------- | 61 | 64 | −70 | 2 | 50.5 | 47.5 |
| B—0.828 | 275 | ---------- | 44 | ---------- | 25 | 6 | 67 | 27 |
| C—0.867 | 300 | 45 | ---------- | 55 | −40 | 1 | 50 | 49 |
| D—0.934 | 370 | 95 | ---------- | 10 | −2 | 18.6 | 50.5 | 30.9 |
| E—0.904 | 410 | 168 | ---------- | 46 | −15 | 10 | 53 | 37 |

Mixtures of mineral oil and fixed oils such as castor oil, lard oil and the like can be used as well as organic synthetic lubricants and mixtures thereof such as:

I. Synthetic lubricants produced by the Fischer-Tropsch, Synthol, Synthine and related processes, e. g.:
   A. Polymerization of olefins such as ethylene, butylene, and the like, and their mixtures in presence of a Friedel-Crafts or other type condensation catalyst under elevated temperatures and pressures.
   B. Polymerization of unsaturated hydrocarbons in presence of a catalyst and then condensing said polymerized product with an aromatic hydrocarbon such as xylol, benzol, naphthalene, etc.
   C. Oxidation of polymerized olefins of lubricating range as noted under A and B.
   D. Process of converting natural gas to carbon monoxide and hydrogen, followed by catalytic reaction under elevated temperature and pressure to produce hydrocarbons of lubricating range (Synthol process).
II. Synthetic lubricating products produced by the Bergius process, e. g., by:
   A. Hydrogenation of coal, peat and related carbonaceous materials under pressure and elevated temperature in presence of a catalyst.
   B. Hydrogenation of asphalts, petroleum residues and the like.
III. Synthetic lubricants produced by the voltolization process, e. g., by:
   A. Voltolization of fatty materials such as fatty oils.
   B. Voltolization of mixtures of fatty oils and petroleum hydrocarbons.
   C. Voltolization of unsaturated hydrocarbons, their mixtures, and the like.
IV. Organic synthetic lubricants:
   A. Alkyl esters of organic acids, e. g.:
      Alkyl lactates
      Alkyl oxalates
      Alkyl sebacates (2-ethylhexyl sebacate)
      Alkyl adipates
      Alkyl phthalates (dioctyl phthalates)
      Alkyl ricinoleates (ethyl ricinoleate)
      Alkyl benzoates
   B. Alkyl, alkylaryl esters of inorganic acids, e. g., such as the phosphorus esters.

This particularly desirable class of oleaginous bases for the present compositions comprises organic phosphorus esters including phosphates, phosphonates, phosphinates, as well as the corresponding oxides. Typical species include:

Tricresyl phosphate
Trioctyl phosphate
Tributyl phosphate
Bis(3,5,5-trimethylhexyl) 2,4,4-trimethylpentene-phosphonate
Tris(3,5,5-trimethylhexyl) phosphate
N-heptenyl bis(3-butylpentane) phosphinate
Bis(3,5,5 - trimethylhexane) octane phosphine oxide Another highly desirable type of phosphorus lubricants includes the diphosphorus compounds including the four classes referred to above. Preferably, the diphosphorus compounds have a configuration as follows:

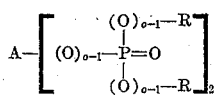

wherein A is an organic radical preferably aliphatic or aromatic hydrocarbon radical or alternatively an oxahydrocarbon radical or the corresponding sulfur, selenium or tellurium containing hydrocarbon radicals preferably saturated aliphatic hydrocarbon radicals having from 4 to 12 carbon atoms. The above configuration contemplates diphosphates, diphosphonates, diphosphinates and diphosphine oxides. A particularly desirable configuration comprises those diphosphates having the following configuration:

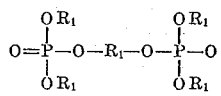

wherein each $R_1$ is an aliphatic hydrocarbon radical having from 2 to 6 carbon atoms. It has been found that lubricants of this particular configuration possess unexpectedly extreme low temperature operating characteristics. Species of such lubricants include:

1,4-butanediol bis(dibutyl phosphate)
1,3-propanediol bis(diamyl phosphate)

V. Synthetic lubricants made by polymerization of alkylene oxides and glycols at elevated temperatures in the presence of catalysts such as iodine, hydriodic acid, etc.:
   A. Polymers of alkylene glycol:
      Trimethylene glycol
      Propylene glycol
      Tetramethylene glycol
      Hexamethylene glycol
      Pentamethylene glycol
   B. Copolymers of:
      Trimethylene glycol and triethylene glycol
      Trimethylene glycol and hexamethylene glycol
      Trimethylene glycol and B-methyltrimethylene glycol
      Trimethylene glycol and diethylene glycol
   C. Copolymers prepared from certain epoxides at elevated temperatures and in presence of KOH or BF3-ether catalyst, e. g.:
      Ethylene oxide and propylene oxide
      Isobutylene oxide and propylene oxide
      Epichlorohydrin and propylene oxide
   D. Sulfur containing polymers obtained by treating allyl alcohol, divinyl ether, diallyl ether, diallyl sulfide, dimethallyl ether, glycols, with $H_2S$ in presence of a catalyst such as toluene sulfonic acid, peroxides, ultra-violet light, e. g.:
      Dihydroxy diethyl sulfide
      Dihydroxy dipropyl sulfide
      Trimethylene glycol and dihydroxy dipropyl sulfide
      Trimethylene glycol and dihydroxy diethyl sulfide
VI. Polymers obtained from oxygen-containing heterocyclic compounds, e. g., polymerization of tetrahydrofuran in the presence of a catalyst.
VII. Silicon polymers, e. g.:
   Polyalkyl siloxane and silicate polymers
   Alkylaryl siloxane and silicate polymers
   Dimethyl siloxane and silicate polymers, etc.

Example

A grease is prepared from mineral lubricating oil gelled with about 7.5% of lithium 12-hydroxy stearate. A second grease is also prepared using the same soap but having in addition 0.5% magnesium hydroxide based on the total grease composition. These are used to lubricate the front wheel bearings of an ordinary passenger car. After 5 miles of operation 13 ccs. of water containing .05% sodium chloride are added to each greased bearing. Thereafter the car is operated for 3200 miles in the case of the grease containing both soap and magnesium hydroxide and 1600 miles for the car containing bearings lubricated with the grease not containing magnesium hydroxide. The water content of both of these greases at the end of the test period is substantially the same. In the latter case, a moderate amount of dynamic corrosion can be observed on the bearing surfaces. Upon standing overnight, the disassembled bearing exhibits an extreme amount of corrosion due apparently to the action of water present in the grease. In comparison the bearing assembly lubricated with the grease containing magnesium hydroxide is fully protected against corrosion during operation and exhibits no static corrosion after disassembly and storage overnight in the presence of the water-diluted grease.

We claim as our invention:

1. A grease composition comprising from about 95% to about 74% by weight of mineral lubricating oil, from about 5% to about 25% by weight of lithium 12-hydroxy stearate, and from about 0.05% to about 1% by weight of magnesium hydroxide, said hydroxide being present in an amount sufficient to substantially improve the static corrosion characteristics of the grease.

2. A grease composition comprising a major amount of a lubricating oil, a minor amount at least sufficient to impart a grease structure to said composition of a lithium soap of a higher hydroxy fatty acid, and from about 0.05% to about 1% by weight of said grease of magnesium hydroxide.

3. A grease composition comprising a major proportion of a lubricating oil, a minor amount at least sufficient to impart a grease structure to said composition of a soap of a higher hydroxy fatty acid, and from about 1% to about 20%, based on the weight of the soap, of magnesium hydroxide.

4. A grease composition comprising a major proportion of mineral lubricating oil, a minor amount at least sufficient to impart a grease structure to said composition of a lithium soap of a higher hydroxy fatty acid, and from about 2.5% to about 15%, based on the weight of the soap, of magnesium hydroxide.

5. A grease composition comprising a major proportion of a mineral lubricating oil, a minor amount at least sufficient to impart a grease structure to said composition of a soap of a higher hydroxy fatty acid and from about 2.5% to about 15% by weight, based on the soap, of magnesium hydroxide.

6. A grease composition comprising a major proportion of a lubricating oil, a minor amount at least sufficient to impart a grease structure to said composition of a soap of a higher hydroxy fatty acid and from about 1% to about 20%, based on the weight of said soap, of magnesium hydroxide.

7. A grease composition comprising a major proportion of a mineral lubricating oil, from about 5% to about 25% based on the weight of the grease of an alkali metal soap of a higher hydroxy fatty acid and from about 1% to about 20% by weight, based on the soap, of magnesium hydroxide.

8. A grease composition comprising a major proportion of a lubricating oil, from about 5% to about 25% by weight of said grease of a soap of a higher hydroxy fatty acid and from about 2.5% to about 15%, based on the weight of the soap, of magnesium hydroxide.

WALTER H. PETERSON.
THURSTON SKEI.

References Cited in the file of this patent

UNITED STATES PATENTS

| Number | Name | Date |
| --- | --- | --- |
| 1,750,761 | Martin | Mar. 18, 1930 |
| 2,079,051 | Sullivan et al. | May 4, 1937 |
| 2,397,956 | Fraser | Apr. 9, 1946 |
| 2,566,793 | Davies | Sept. 4, 1951 |